(12) United States Patent
Dalal et al.

(10) Patent No.: US 8,462,386 B2
(45) Date of Patent: Jun. 11, 2013

(54) MINIMIZING SPECTROPHOTOMETER IMPACT ON SPOT COLOR ACCURACY

(75) Inventors: Edul N. Dalal, Webster, NY (US); Wencheng Wu, Webster, NY (US); Alvaro E. Gil, Rochester, NY (US); Peter A. Crean, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 872 days.

(21) Appl. No.: 12/607,212

(22) Filed: Oct. 28, 2009

(65) Prior Publication Data
US 2011/0096330 A1 Apr. 28, 2011

(51) Int. Cl.
*G01J 3/46* (2006.01)

(52) U.S. Cl.
USPC ............ 358/1.9; 358/1.4; 358/504; 358/518; 356/402; 356/408; 702/196; 702/182

(58) Field of Classification Search
USPC .................. 358/1.4, 1.18, 504, 518; 356/402, 356/408; 702/196, 182
See application file for complete search history.

(56) References Cited

U.S. PATENT DOCUMENTS

| | | | |
|---|---|---|---|
| 2008/0043264 A1 | 2/2008 | Gil et al. | 358/1.9 |
| 2008/0043271 A1 | 2/2008 | Gil et al. | 358/1.9 |
| 2008/0247770 A1* | 10/2008 | Morales et al. | 399/49 |
| 2009/0009766 A1* | 1/2009 | Bonino et al. | 356/402 |
| 2009/0161127 A1* | 6/2009 | Schweid et al. | 358/1.9 |
| 2010/0092083 A1* | 4/2010 | Herloski et al. | 382/168 |

* cited by examiner

*Primary Examiner* — King Poon
*Assistant Examiner* — Allen H Nguyen
(74) *Attorney, Agent, or Firm* — Richard H. Krukar; Kermit O. Lopez; Luis M. Ortiz

(57) ABSTRACT

Differences between an offline spectrophotometer and an inline spectrophotometer can result in differences between a hardcopy target color and a printed reproduction of that color. The inline spectrophotometer is inside of a printer and configured to measure printer output. As such, the inline spectrophotometer cannot conveniently measure the hardcopy target color. A printing error or an instrument offset can be determined and passed to a color correction module that updates the device dependent color specification associated with the given spot color. This color specification may be stored, for example, in the printer controller, and used when a document subsequently calls for that spot color, thereby providing accurate color reproduction from that particular printer incorporating that particular inline spectrophotometer.

13 Claims, 4 Drawing Sheets

MINIMIZING SPECTROPHOTOMETER IMPACT ON SPOT COLOR ACCURACY

Embodiments are related to color printing, color spaces, color measurement, and color matching.

BACKGROUND

Certain advanced color printers contain inline spectrophotometers for use in color matching. Color matching is the process of ensuring that a newly printed or otherwise applied color appears the same as a desired color. In printing, color matching is critical in many applications such as photographic printing and branding. Photographic printing covers such applications as printing photographs in magazines, brochures, and advertising materials. Branding often requires the precise reproduction of certain specific colors that are associated with a brand such as a corporate logo or other trademark/service mark. Specific colors that must be reproduced precisely are known as spot colors.

The spot colors are often available in the form of a swatch or other color reference that can be measured by an offline spectrophotometer to produce a measurement in the L*, a*, b* color space. As is well known in the printing arts, colors are often defined in L*, a*, b* coordinates because the color definition is thereby "device independent". The device independent color definitions are converted into device dependent color specifications before printing. A printed spot color rarely exactly matches the color reference for a variety of reasons. The difference between the printed spot color and the reference color is often called a color matching error.

One source of matching errors is that different printers, even those using the same inks, usually produce slightly different colors when given the same device dependent color specifications. As such, the conversions themselves are often device dependent when mapping device independent color definitions to device dependent color specifications. Some details of color space conversion and color gamut mapping are detailed in U.S. Patent Applications 2008/0043271 and 2008/0043264 which are both herein included by reference. These patent applications also detail the operation of certain automated spot color editors (ASCEs).

The terms "device dependent color specification" and "device independent color definition" are used throughout this document. In keeping with convention, these terms refer to dependence or independence on the marking device, not on the color measurement instrument. Thus a "device dependent color specification" would be, for example, in CMYK colorant space, while a "device independent color definition" would be, for example, in L*, a*, b* color space. While L*, a*, b* color measurements do certainly depend to some extent on the instrument on which they are measured, and such dependence is in fact an important aspect of this invention, this is not at all meant by the term "device dependent".

Current techniques for matching spot colors work well but still produce measurable matching errors. Systems and methods that further reduce or eliminate those measurable matching errors are needed.

BRIEF SUMMARY

Aspects of the embodiments address limitations and flaws in the prior art by reducing the component of matching errors that is due to differences between an offline spectrophotometer that measures a color reference and an inline spectrophotometer within a printer that measures the printed color.

It is therefore an aspect of the embodiments that an offline instrument, such as a spectrophotometer, measures a hardcopy target color to produce a first offline color measurement. The first offline color measurement is device independent because the offline instrument either directly produces such measurements or because its measurements are converted into device independent ones. The L*, a*, b* color space is a device independent color space in which the first offline color measurement can be expressed. The hardcopy target color is a physical example of the desired color such as a swatch or other reference color specimen.

It is another aspect of the embodiments that a color matching module converts device independent color definitions into device dependent color specifications. The color matching module converts the first offline color measurement into a first device dependent color specification. The color matching module can be customized for or calibrated for a specific printer.

It is a further aspect of the embodiments that the printer has an inline instrument, such as a spectrophotometer, that also produces device independent measurements. The printer can attempt to print a color matching the hardcopy target color by printing the color specified by the first device dependent color specification to thereby print a first printed color. The inline instrument measures the first printed color to produce a first inline color measurement. The first printed color, being a printing onto a substrate, is then taken to the offline instrument and measured to produce a second offline color measurement.

It is yet another aspect of the embodiments that a printed color difference can be calculated as the difference between the second offline target color measurement and the first offline color measurement. Similarly, an instrument color difference can be calculated as the difference between the second offline target color measurement and the first inline target color measurement. The instrument offset and the printing error are examples of correction inputs that can be passed to a color correction module.

It is a yet further aspect of the embodiments that the color correction module accepts the correction inputs and uses them to update the device dependent color specification associated with the given spot color. This color specification may be stored, for example, in the printer controller, and used when a document subsequently calls for that spot color, thereby producing a print having an accurate spot color reproducing the hardcopy target color.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

Differences between an offline spectrophotometer and an inline spectrophotometer can result in differences between a hardcopy target color and a printed reproduction of that color. The inline spectrophotometer is inside of a printer and configured to measure printer output. As such, the inline spectrophotometer cannot conveniently measure the hardcopy target color. A printing error or an instrument offset can be determined and passed to a color correction module that updates the device dependent color specification associated with the given spot color. This color specification may be stored, for example, in the printer controller, and used when a document subsequently calls for that spot color, thereby providing accurate color reproduction from the printer incorporating that particular inline spectrophotometer.

Figure 1:
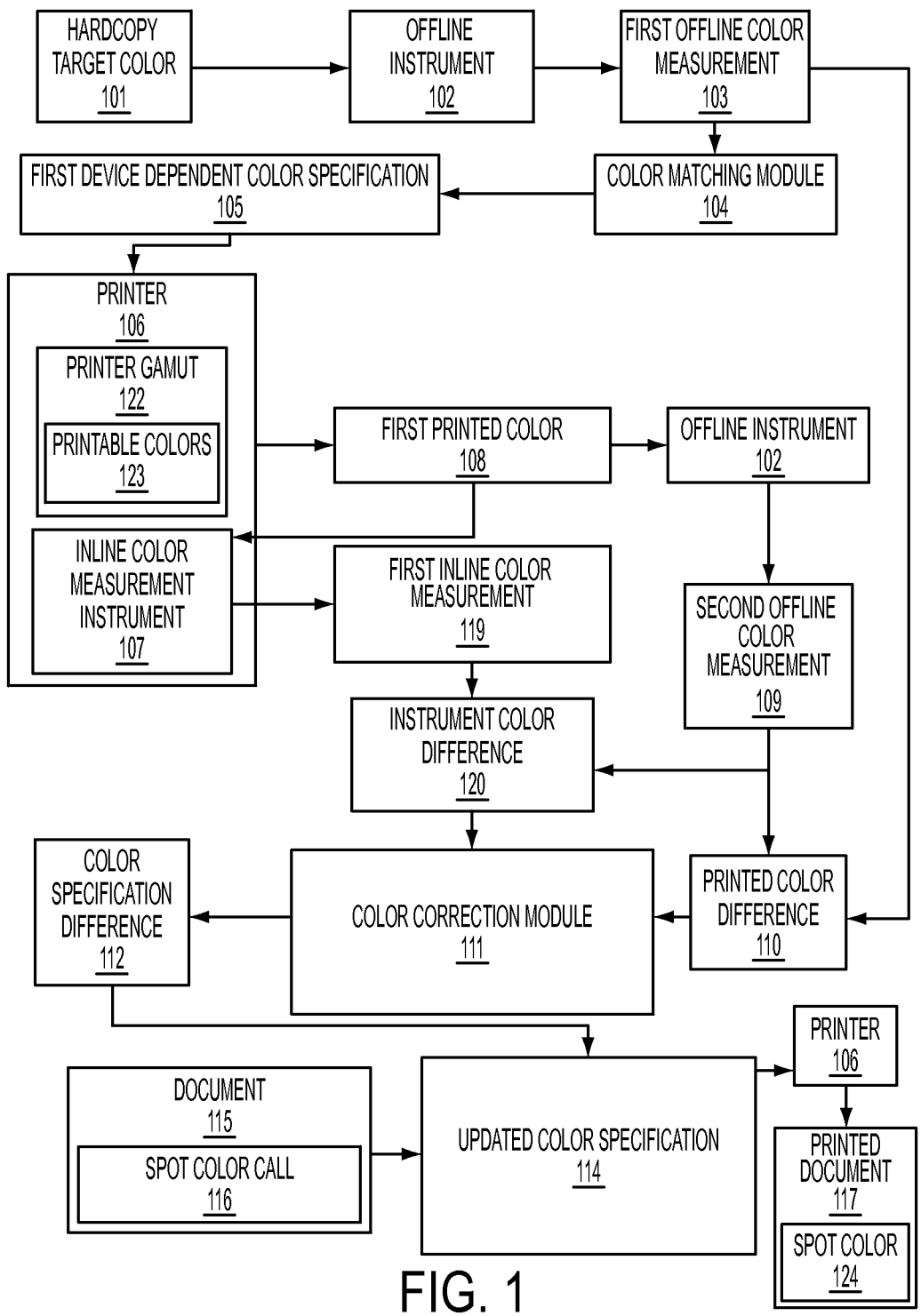
FIG. 1 illustrates a system that corrects for differences in color measurement devices, such as spectrophotometers, in accordance with aspects of the embodiments.

FIG. 1 illustrates a system that corrects for differences in color measurement devices, such as spectrophotometers, in accordance with aspects of the embodiments. An offline instrument 102 measures a hardcopy target color 101 to produce a first offline color measurement 103. The offline instrument 102 is "offline" because it is not part of printer 106 but is separate. For example, it can be a stand alone instrument located on a different continent from the printer 106, although that would add logistical complications to the invention disclosed herein. The hardcopy target color 101 can be an example of spot color that is to be reproduced by the printer 106 as faithfully as possible. The first offline color measurement 103 can be device independent such as a L*, a*, b* color coordinate.

The first offline color measurement 103 is passed to a color matching module 104 that translates it into a first device-dependent color specification 105. The first device-dependent color specification 105 is device dependent, which means that it is intended for a specific device such as printer 106. In a perfect world, the printer 106 could accept the first device-dependent color specification 105, render it onto printable media, and thereby produce a spot color exactly matching the hardcopy target color 101. In the real world, other steps must be taken to produce a close color match. As such, the printer 106 uses the first device-dependent color specification 105 to produce a first printed color 108.

The printer 106 has an inline color measurement instrument 107 and a printer gamut 122 of printable colors 123. Any color outside of the printer gamut 122 can not be faithfully reproduced by the printer 106, but can be approximated by choosing a similar color within the printer gamut 122. Regardless, the inline color measurement instrument 107 measures the first printed color 108 to produce a first inline color measurement 119.

The first printed color 108 is then taken to the offline instrument 102 and measured to produce a second offline color measurement 109. Note that the figure has two boxes labeled "Offline Instrument 102". In practice, these two boxes indicate either the exact same offline instrument or two offline instruments that have been calibrated such that they produce the equal measurements when given the same target.

The instrument color difference 120 is the difference between the first inline color measurement 119 and the second offline color measurement 109. It is called an "instrument color difference" because the measurements are two measurements of the same sample (the first printed color 108) taken by two different instruments. The printed color difference 110 is the difference between the first offline color measurement 103 and the second offline color measurement 109. It is called a "printed color difference" because the same instrument measures a desired color and an attempted reproduction. The printed color difference error 110 and the instrument color difference 120 are examples of correction inputs.

Correction inputs can be passed to a color correction module 111 that produces a color specification difference 112, which is used to update the device dependent color specification 114 associated with the given spot color. A document 115 contains one or more spot color calls 116 that specify the spot colors to be printed within the document. Printing the document 115 with printer 106 (both printers 106 are the exact same device) produces a printed document 117. The spot colors 124 in the document 117 have been corrected for differences between the inline instrument 107 and the offline instrument 102.

The color correction module 111 can accept the first offline color measurement 103 and the first inline color measurement 119 and produces an inline correction that corrects printed colors under the assumption that the inline instrument 107 perfectly matches the offline instrument 102.

Figure 2:
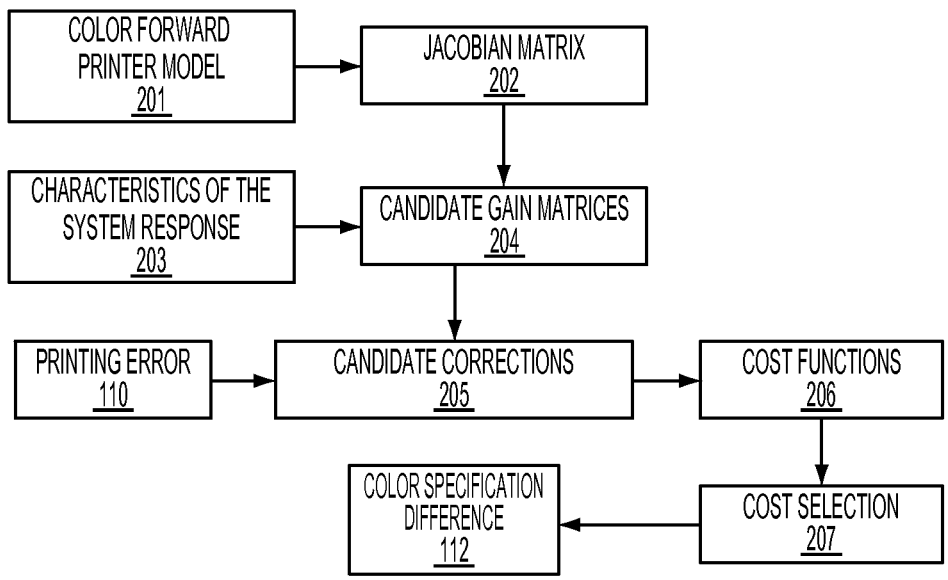
FIG. 2 illustrates using a cost function to select a correction from amongst a group of candidate gain matrices in accordance with aspects of some embodiments.

FIG. 2 illustrates using a cost selection 207 to select a color specification difference 112 from amongst a group of candidate gain matrices 204 in accordance with aspects of some embodiments. Those practiced in the art of color mapping and the color conversion aspects of the printing arts are familiar with color forward printer models. A printer can be calibrated to produce a color forward printer model 201. Given a mixture of colorants (inks, dyes, pigments, or toners), the color forward printer model 201 predicts the color that the printer will produce. The color forward printer model 201 can include a Jacobian matrix 202 or can be used to produce a Jacobian matrix 202. The Jacobian matrix 202 is a linear algebraic formulation for calculating the output color from an input specifying the deposition of colorants.

Candidate gain matrices 204 can be derived using the Jacobian matrix 202 and the desired characteristics of the system response 203. Multiplying the candidate gain matrices 204 by the printing error 110 results in a set of candidate color corrections 205. The candidate corrections 205 can then be passed to the cost functions 206 that evaluate each candidate correction against a criterion. That criterion can be the perceived difference between the desired color and the predicted output color. The cost selection 207 selects a correction based on the minimal cost. The selected correction results in a color specification difference 112, which is used to update the device dependent color specification 114 of the given spot color.

Figure 3:
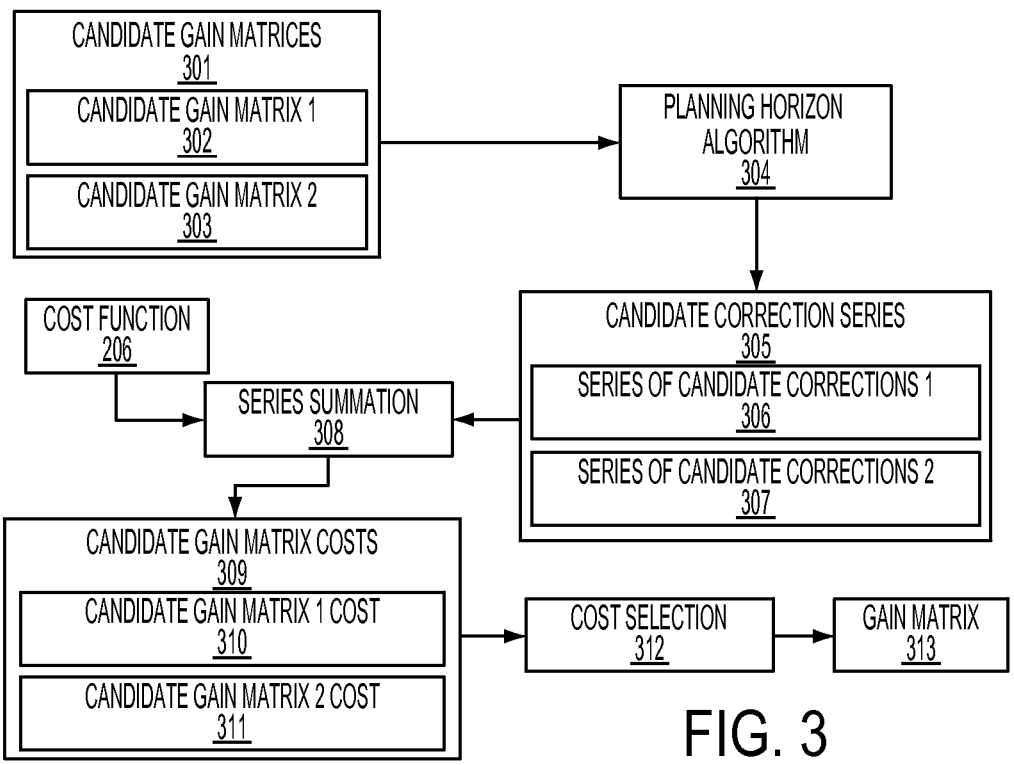
FIG. 3 illustrates using a cost function to select a gain matrix from amongst a group of candidate gain matrices that have been treated by a planning horizon algorithm in accordance with aspects of some embodiments.

FIG. 3 illustrates using a cost function to select a gain matrix from amongst a group of candidate gain matrices that have been treated by a planning horizon algorithm in accordance with aspects of some embodiments. Candidate gain matrices 301 such as candidate gain matrix 1 302 and candidate gain matrix 2 303 are passed to a planning horizon algorithm 304 to produce candidate correction series 305. Candidate gain matrix 1 302 results in series of candidate corrections 1 306. Candidate gain matrix 2 303 results in series of candidate corrections 2 307. The series are summed 308 after the application of a cost function 206 to the series elements to determine candidate gain matrix costs 309. Candidate gain matrix 1 302 results in candidate gain matrix 1 cost 310. Candidate gain matrix 2 303 results in candidate gain matrix 2 cost 311. Cost selection 312 can then select a gain matrix 313, perhaps to minimize cost.

U.S. Patent Applications 2008/0043271 and 2008/0043264 teach the details of gain matrices, planning horizon algorithms, and cost functions.

Figure 4:
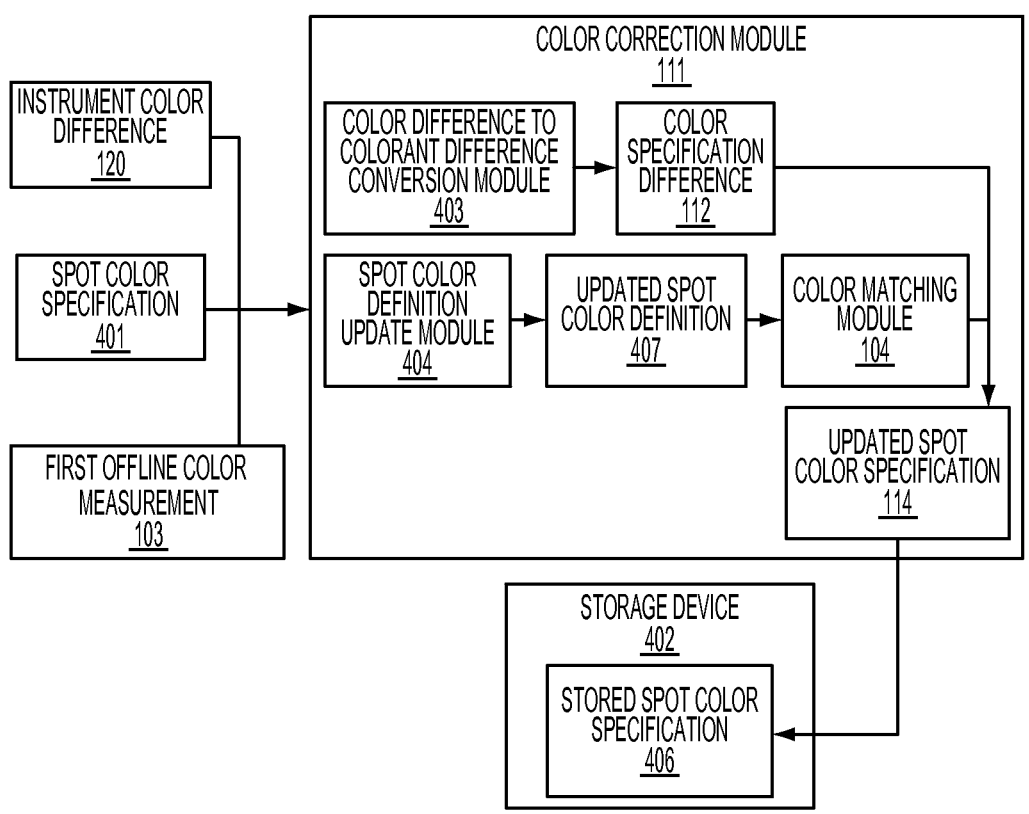
FIG. 4 illustrates a system passing an instrument offset to a color correction module in accordance with aspects of some embodiments.

FIG. 4 illustrates a system passing an instrument color difference 120 to a color correction module 111 in accordance with aspects of some embodiments. In one embodiment, the color correction module 111 produces an updated spot color specification 114 by first converting the instrument color difference 120 in device independent color space to a device dependent color specification difference 112 using a color difference to colorant difference conversion module 403. Here the color difference to colorant difference module 403 may calculate colorant difference by multiplying the partial derivative matrix 203 or the gain matrix 204, described earlier, by the color difference. The color specification difference 112 is then combined with the previous spot color specification to yield an updated spot color specification 114. In yet another embodiment, the color correction module 111 produces an updated spot color specification 114 by passing the device independent spot color definition associated with the spot color specification 401 and the instrument color difference 120 in device independent color space, together with the first offline color measurement 103, to the spot color definition update module 404 to calculate an updated device independent spot color definition 407. This updated spot color definition 407 is then passed to the color matching module 104 to yield an updated device dependent spot color specification 114. This updated spot color specification 114 will then be used instead of the original spot color specification 401 when a document calls for this spot color. Optionally, the updated spot color specification 114 may be used to update the stored spot color specification 406 in a storage device 402.

Figure 5:
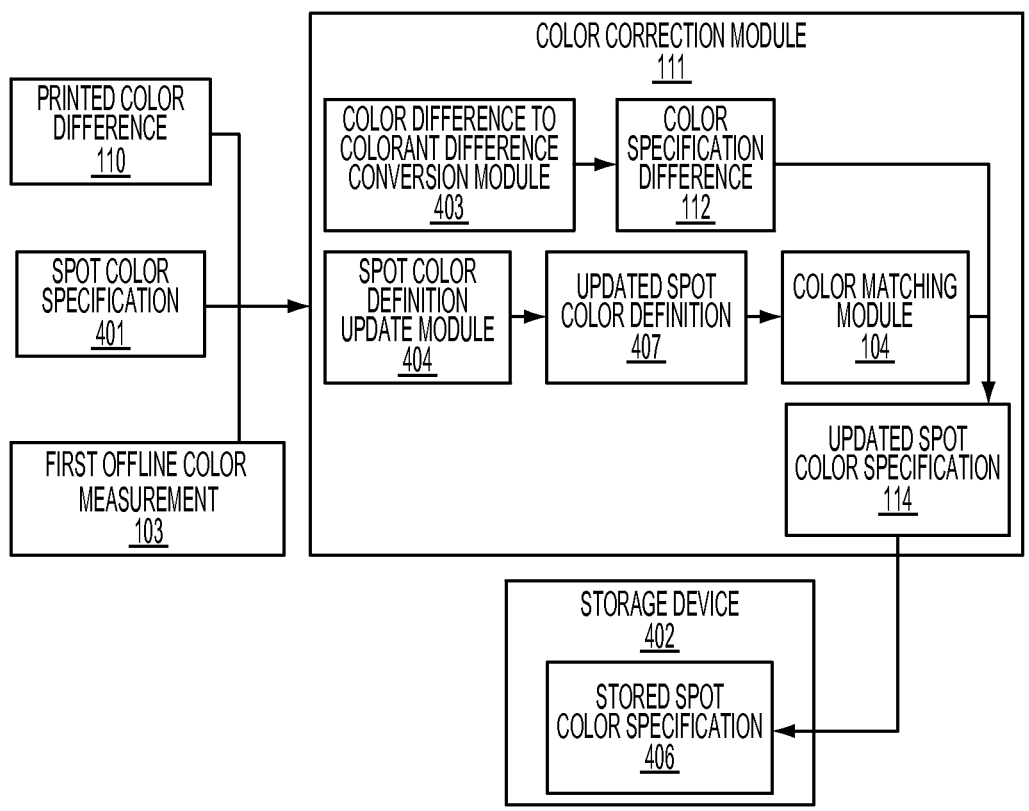
FIG. 5 illustrates a system passing a printing error to a color correction module in accordance with aspects of some embodiments.

FIG. 5 illustrates a system passing a printed color difference 110 to a color correction module 111 in accordance with aspects of some embodiments. The difference between FIG. 5 and FIG. 4 is that the color correction module produces the color specification difference 112 from the printed color difference 110 and the first inline measurement 119.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of producing a spot color that matches a hardcopy target color, comprising:
    measuring the hardcopy target color on an offline instrument to produce a first offline color measurement $Lab_{o1}$;
    converting the first offline color measurement $Lab_{o1}$ to a first device-dependent color specification;
    printing the first device-dependent color specification on a printer comprising an inline color measurement instrument, thereby printing a first printed color;
    measuring the first printed color on the inline color measurement instrument to produce a first inline color measurement $Lab_{i1}$, and measuring the first printed color on the offline instrument to produce a second offline color measurement $Lab_{o2}$;
    deriving a device-dependent color specification difference from the instrument color difference $Lab_{i1}-Lab_{o2}$;
    adding the device-dependent color specification difference to the first device-dependent color specification, thereby updating the device-dependent spot color specification for that spot color;
    printing the spot color according to the updated device-dependent spot color specification.

2. The method of claim 1, further comprising:
    storing the updated device-dependent spot color specification.

3. The method of claim 1, wherein the device-dependent spot color specification is in terms of CMYK values.

4. The method of claim 3 wherein the device-dependent spot color specification is in terms of CMYK values and additional colorants.

5. The method of claim 1, wherein the deriving the device-dependent color specification difference further comprises:
    computing a Jacobian matrix from a forward printer model and the first device-dependent color specification;
    computing a partial derivative matrix from the Jacobian matrix; and
    deriving the device-dependent color specification difference as a product of the instrument color difference $Lab_{i1}-Lab_{o2}$ and the partial derivative matrix.

6. The method of claim 1, wherein the deriving the device-dependent color specification difference further comprises:
    computing a Jacobian matrix from a forward printer model and the first device-dependent color specification;
    computing a gain matrix from the Jacobian matrix; and
    deriving the device-dependent color specification difference as a product of the instrument color difference $Lab_{i1}-Lab_{o2}$ and the gain matrix.

7. The method of claim 1, wherein updating the device-dependent spot color specification comprises producing a color correction for out-of-gamut colors, the method further comprising clipping the device-dependent color specification to the nearest in-gamut value of the device-dependent color specification.

8. The method of claim 1 wherein updating the device-dependent spot color specification comprises producing a color correction for out-of-gamut colors, the method further comprising:
    computing a set of Jacobian matrices from a forward printer model;
    computing a set of candidate gain matrices from the Jacobian matrices; and
    multiplying each of the candidate gain matrices by the instrument color difference $Lab_{i1}-Lab_{o2}$ combined with the first device-dependent color specification to produce a plurality of candidate device-dependent color corrections, each having a cost determined by a cost function, wherein the color correction is set to the candidate device-dependent correction having the lowest cost.

9. The method of claim 1 wherein updating the device-dependent spot color specification comprises producing a color correction for out-of-gamut colors using a controller and planning systems, the method further comprising:

computing a set of Jacobian matrices from a forward printer model;

computing a set of candidate gain matrices from the Jacobian matrices;

multiplying each of the candidate gain matrices by the instrument color difference $Lab_{i1} - Lab_{o2}$ combined with the first device-dependent color specification to produce a plurality of candidate device-dependent color corrections over a planning horizon, each device-dependent color correction having a cost determined by a cost function, wherein the color correction is set to the candidate device-dependent color correction having a lowest cumulative cost function over the planning horizon.

10. A method of producing a spot color that matches a hardcopy target color, comprising:

measuring the hardcopy target color on an offline instrument to produce a first offline color measurement $Lab_{o1}$;

submitting the first offline color measurement to a printer comprising an inline color measurement instrument and printing a first printed color;

measuring the first printed color on the inline color measurement instrument to produce a first inline color measurement $Lab_{i1}$, and measuring the first printed color on the offline instrument to produce a second offline color measurement $Lab_{o2}$;

updating a spot color definition to be $Lab_{o1} + Lab_{i1} - Lab_{o2}$; and printing the spot color according to the updated spot color definition.

11. The method of claim 10, further comprising storing the updated spot color definition.

12. The method of claim 10, wherein the spot color specification is in terms of CMYK values.

13. The method of claim 10, wherein the spot color specification is in terms of CMYK values and additional colorants.

* * * * *